Oct. 27, 1936.  L. HARRISON  2,058,444
BEAM TESTING DEVICE
Filed April 19, 1933  5 Sheets-Sheet 1
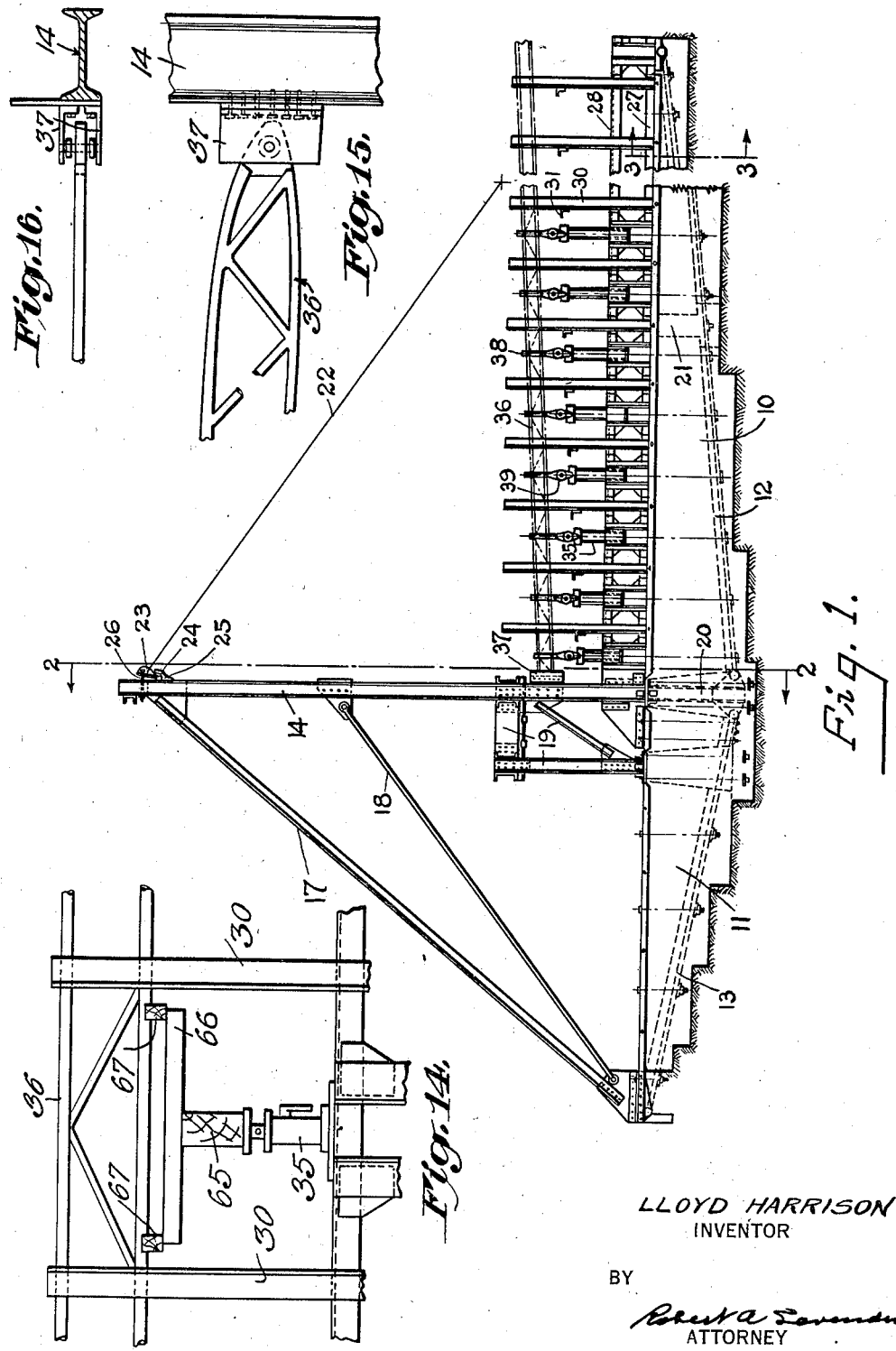
LLOYD HARRISON
INVENTOR
BY
ATTORNEY Oct. 27, 1936.   L. HARRISON   2,058,444
BEAM TESTING DEVICE
Filed April 19, 1933   5 Sheets-Sheet 2
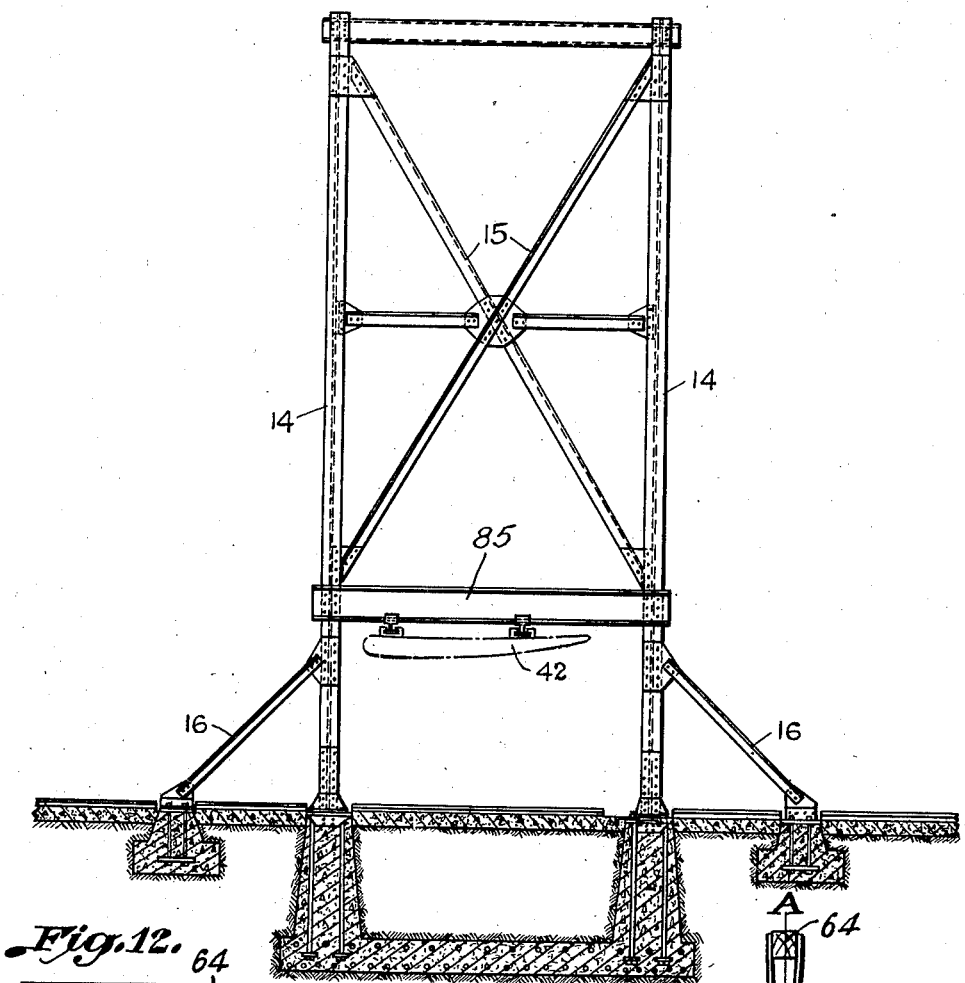
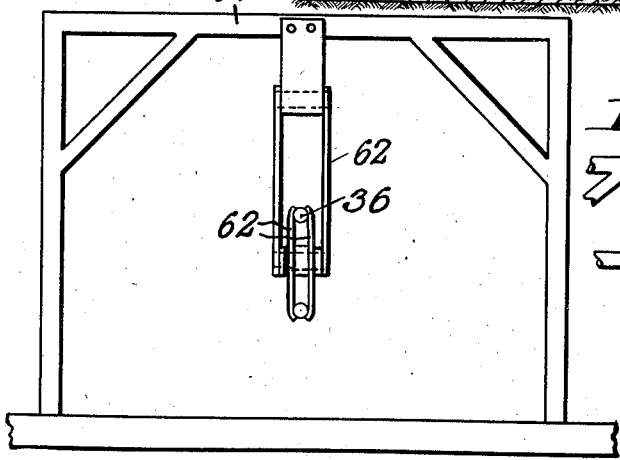
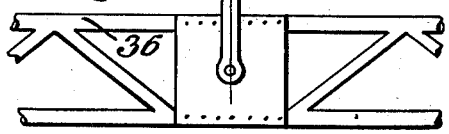
LLOYD HARRISON
INVENTOR
BY
*Robert A. Lavender*
ATTORNEY Oct. 27, 1936.　　　　　L. HARRISON　　　　　2,058,444
BEAM TESTING DEVICE
Filed April 19, 1933　　　5 Sheets-Sheet 3
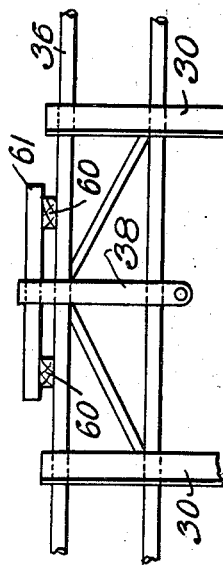
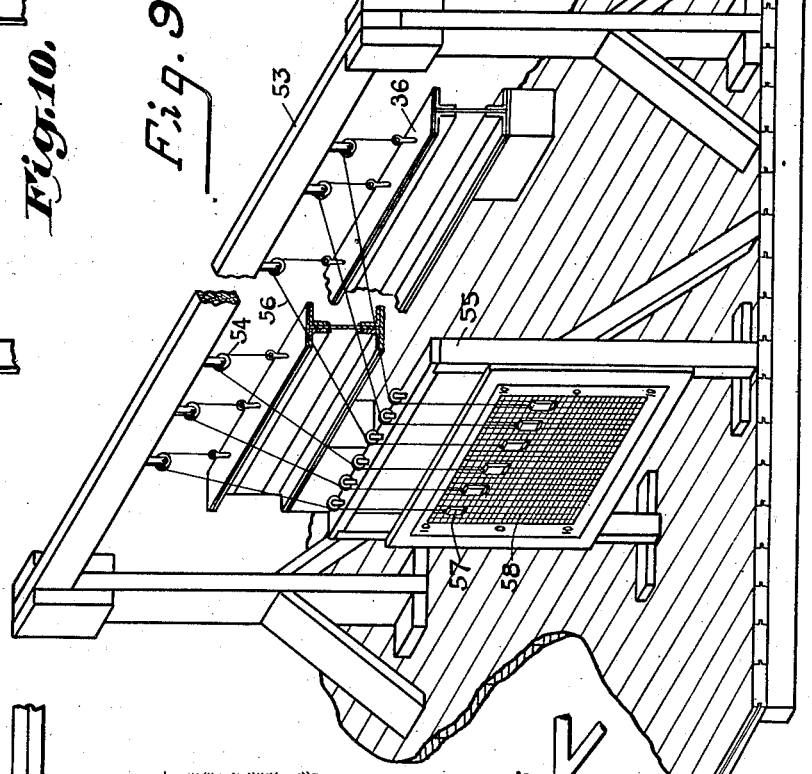
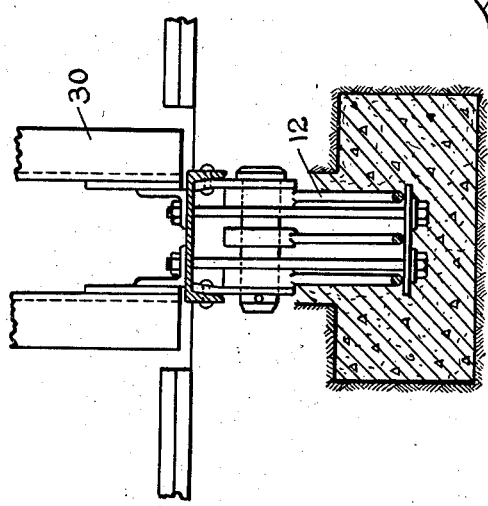
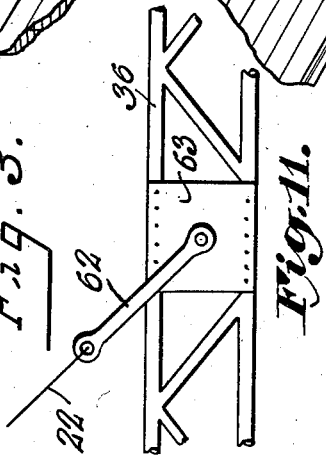
LLOYD HARRISON
INVENTOR
BY
*Robert A. Tavender*
ATTORNEY

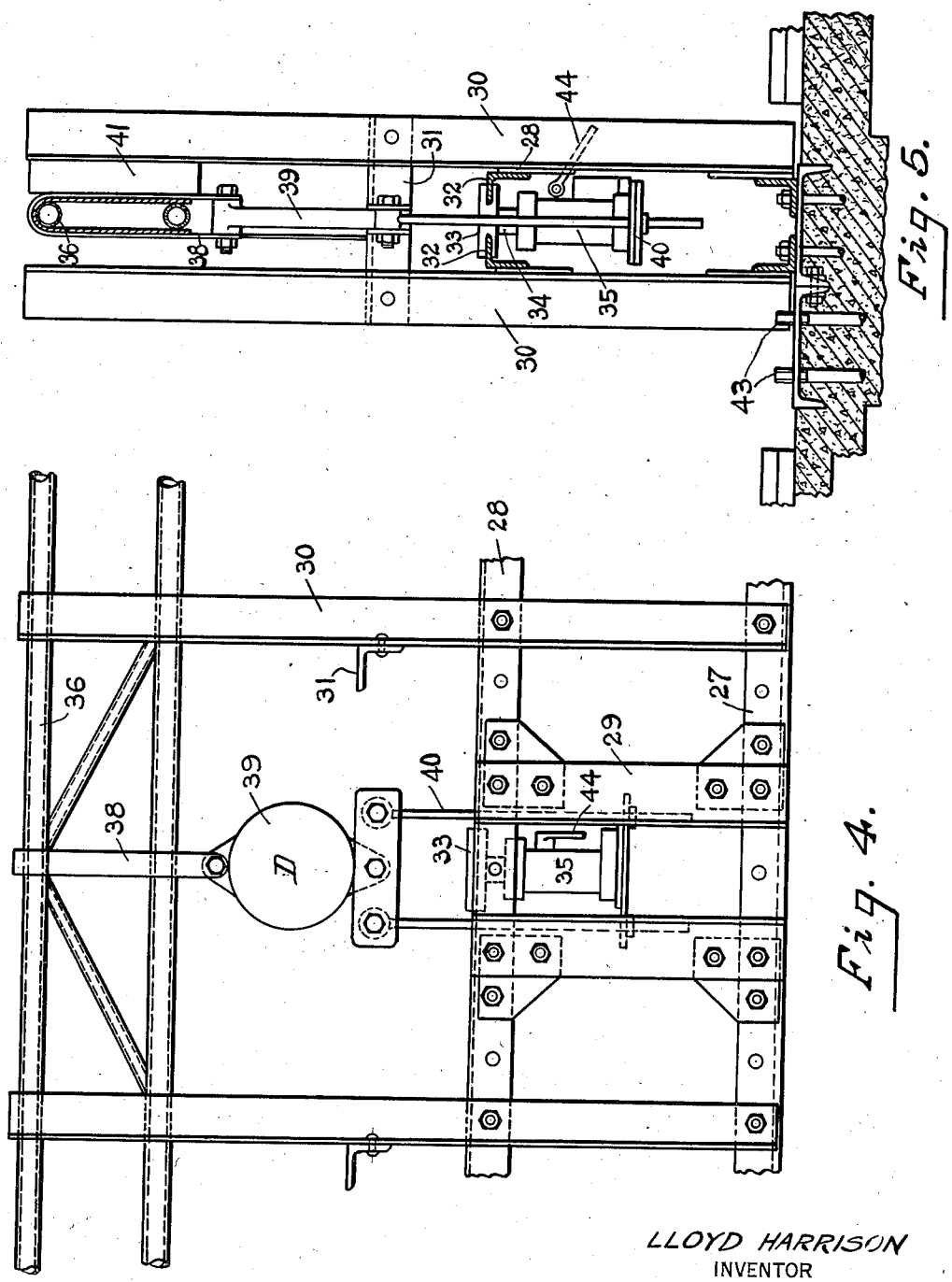

Oct. 27, 1936.                L. HARRISON                2,058,444
                            BEAM TESTING DEVICE
                       Filed April 19, 1933        5 Sheets-Sheet 5

LLOYD HARRISON
INVENTOR
BY
ATTORNEY

Patented Oct. 27, 1936

2,058,444

UNITED STATES PATENT OFFICE 2,058,444

BEAM TESTING DEVICE

Lloyd Harrison, United States Navy

Application April 19, 1933, Serial No. 666,885

13 Claims. (Cl. 265—14)

(Granted under the act of March 3, 1883, as amended April 30, 1928; 370 O. G. 757)

This invention relates to a mechanism for testing in various ways the strength of structural elements, such as the spars of airplanes.

It is the object of this invention to provide means for adequately supporting a specimen undergoing tests, for applying desired loads to different parts of such specimen and to indicate the deformation of the specimen under applied loads.

A further object is to provide a device of the type mentioned whereby axial loads of various magnitudes may be imposed upon the test specimen.

A still further object is to provide loading means of such nature that the stress applied at any given point will be automatically maintained in spite of deflection of that point due to loading on adjacent parts of the test specimen.

With the above and other objects in view, this invention consists in the construction, combination and arrangement of parts as will be described more fully hereinafter.

In the drawings:

Fig. 1 is a side elevational view of an installation according to my invention;

Fig. 2 is a transverse section of my device as used to test a complete airplane wing, taken on a line corresponding to line 2—2 of Fig. 1;

Fig. 3 is a sectional detail on line 3—3 of Fig. 1;

Figs. 4 and 5 are, respectively, side elevation and end elevation views of one loading unit;

Fig. 9 is a schematic view of the deflection indicating part of the apparatus, shown separately for the purpose of clearness.

Fig. 10 shows means for distributing the stress from each load over a considerable length of the test specimen;

Fig. 11 shows a mode of attachment of the lift reaction stay to a test specimen;

Figs. 12 and 13 illustrate the use of a trestle for applying a purely vertical load to a test specimen, the views therein being taken transversely of and parallel to the specimen, respectively;

Fig. 14 shows the method of applying the thrust of a jack in an upward direction;

Figs. 15 and 16 are respectively a side elevation and a top plan view of the means for securing a specimen to the main framework of my apparatus.

Figure 6:
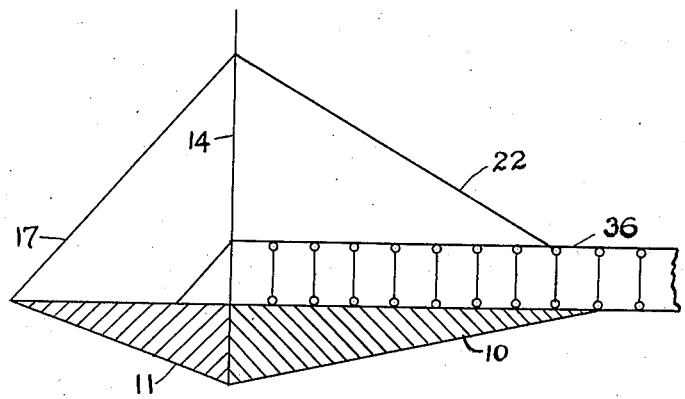
Fig. 6 is a schematic diagram of the elements of the apparatus.
Figure 7:
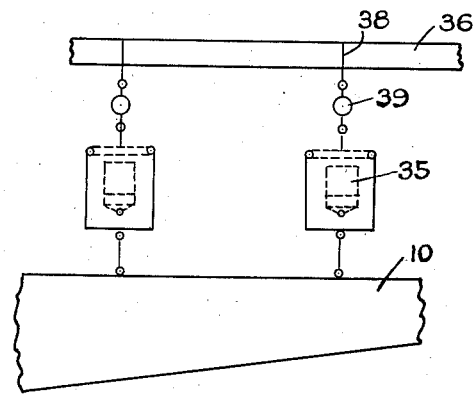
Fig. 7 is a schematic detail of the loading mechanism.

The present invention was developed primarily for testing the structural elements of airplane wings and is described principally in connection with applying to such elements both transverse and axial loads. However, it is equally useful for testing any kind of beam or the like either with or without end load.

As the complete device is made up of double structures, one on each side, the construction of but one side is described.

An assembly view of a preferred form of construction is shown in Fig. 1. It comprises a heavy base beam 10 of concrete and a similar but shorter back beam 11 that is in effect a continuation of the base beam, the two constituting a double cantilever structure. The two beams mentioned are reinforced and given longitudinal strength by rods 12 and 13 extending from their junction to their respective outer ends. The vertical standard 14 is suitably secured at its foot to the base and back beams at their junction, the standards of the two sides of the installation being connected together by cross pieces 15 as shown in Fig. 2 and also being given additional lateral rigidity by the braces 16. The standard 14 is connected to the outer end of back beam 11 by a back stay 17 and also by a back brace 18 if desired. The lower portion of the standard is made rigid to resist end thrust of a test specimen to which an axial load is applied by means of the brace elements generally designated by numeral 19. The base beams on the two sides are tied together by transverse concrete walls 20 and 21.

When it is desired to apply axial load to the test specimen, the lower end of lift wire reaction stay 22 is connected to a suitable point of the specimen, the other end of stay 22 being secured to a member 23 at the upper end of standard 14. The lower edge of member 23 is rounded, as indicated at 24, and fits in a suitable bracket 25 fixed to standard 14; a bolt 26 passes through standard 14 and member 23, leaving member 23 some freedom of movement to rock on the portion 24 to adjust for different inclinations of the reaction stay 22.

From the principles of the composition and resolution of forces, it is evident that any downward load applied to beam 36 will, due to the relation between reaction stay 22 and the beam, be resolved into two components, one of which will react longitudinally of the beam and apply an axial load thereto and the other component will be vertical. Bracket 25 is adjustable on member 14 and by lowering or raising the bracket the axial load can be increased or decreased.

A composite steel beam comprising a lower member 27 that is fixed to the base beam and an upper member 28 connected thereto by tie members 29, provides a rigid reaction structure against which the loading means may operate. At each side of the above mentioned composite beam is a series of upright members 30 that are adjustably connected to the composite beam for movement therealong, as desired, the upright members in the two series being connected together in pairs by transverse ties 31. The members 28 are angle bars having their horizontal flanges 32 turned toward each other and between these flanges are mounted blocks 33 against which the plungers 34 of the jacks 35 bear; the blocks 33 are slidable along the flanges 32 and so permit the movement of the jacks to any points along the specimen being tested.

The test specimen 36, shown in the drawings as a beam for an airplane wing, is supported at one end by a fitting 37 on standard 14 and at some other desired point by the lift wire reaction stay 22 connected to a clevis 62 or the like secured to plates 63 that are fixed on the beam at the chosen point. If the particular test being made requires the elimination of axial load, the end of specimen 36 remote from standard 14 may be supported by a trestle 64 at the said remote end from which the beam may be suspended by clevis 62 and plates 63. At each loading point on the specimen 36 a strap 38 is passed over the specimen and connected to an indicating dynamometer 39 which is also connected to a stirrup 40 in which the jack 35 is fitted. When it is desired to distribute the load applied by a jack over a greater length of the specimen than the width of strap 38, blocks 60 may be placed on the upper surface of the specimen at the extremity of the length over which such distribution is to be effected and a rigid member 61 may be laid over the blocks. It is apparent that when a jack 35 is actuated, the force exerted by plunger 34 against the immovable block 33 will cause the stirrup 40 to be moved downwardly and hence the force exerted by the jack will be transmitted through the dynamometer 39 and strap 38 to the test specimen, the magnitude of that force being indicated by the dynamometer. When the transverse dimension of the test specimen is considerably less than the distance between members 30, lateral tilting of the specimen may be prevented by placing blocks 41 between the specimen and members 30. As shown in Fig. 5, additional bolts 43 may be set in the concrete of the base beam to provide for lateral movement of one or both of the pairs of members 30 whereby the distance between the members in a pair or the pairs on the two sides of the device may be varied. While Figs. 4 and 5 show the jacks 35 provided with handles 44 for manual operation, the jacks are preferably actuated by a hydraulic pressure system that will be presently described.

Figure 8:
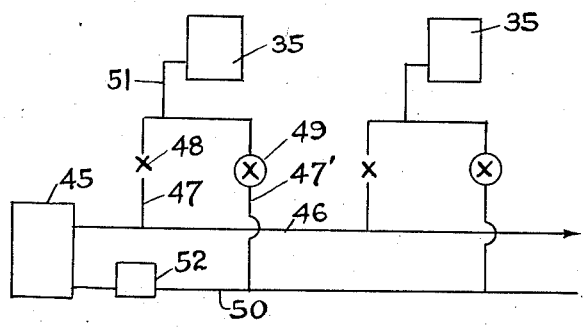
Fig. 8 is a diagrammatic layout of the connections to the hydraulically operated loading device.

Fig. 2 shows a complete airplane wing 42 mounted for testing. It will be noted that test specimens of this width are secured to members 85 extending between the opposite sides of the installation, the loading straps being modified to correspond to the shape of the specimen. In Fig. 8 there is shown diagrammatically a hydraulic pressure system for operating the jacks 35. A constant pressure pump 45 of the rotary movable plunger type capable of supplying the required volume of liquid at approximately 1000 pounds per square inch pressure discharges into a pressure line 46 that is large enough to make flow losses negligible. Each jack is connected to pipe 46 by a flexible feed tube 47, there being a globe valve 48 connected in said tube to throttle the flow of fluid and also a hand adjusted calibrated relief valve 49 in the return portion 47' that connects to lead line 50. The jack 35 is connected to tube 47 intermediate the valves 48 and 49 by a tube 51 which thus transmits to the jack a constant pressure equal to that present between the valves. There is a continuous flow of fluid through the valves 48 and 49 but there is only sufficient flow through the tube 51 to jack 35 to maintain constantly the desired force upon the jack plunger. It is apparent that this mode of connecting the jacks keeps the load constant even though the test specimen may be deflected at any strap 38 due to the stress applied by adjacent jacks. That is, if at any particular strap the test specimen is bent toward the jack acting upon that strap, enough fluid will be passed into that jack to take up the slack due to such movement and thus maintain the load upon that strap. The return pipe 50 connects to a vented suction tank 52 whence the fluid is passed to the pump. The system just described permits the simultaneous application of load at all the chosen points along the test specimen and has the further advantage that the necessary operating personnel is much reduced over previously known systems. Further, the loads can be rapidly applied and removed by merely changing the pressure of the pump output and the forces exerted by the several jacks can be individually controlled by the valves 48 and 49. The danger attendant upon the use of suspended weights is entirely eliminated.

Valve 49 is described as a "relief" valve and valve 48 as a throttle valve in order to make a distinction as to their functioning. Each performs a throttling operation (pressure reduction by means of flow through a constrained orifice to a larger outlet). The high, practically constant pressure in line 46 is reduced to an intermediate value at the jacks by throttled flow of liquid through valve 48, and from the intermediate value to the negligible return line value by a second throttled flow of the same liquid through valve 49, the whole process being designed to secure the desired intermediate pressure value by this means. If the pressure at the inflow end of valve 48 were maintained absolutely constant regardless of flow in the supply line and of interference of other valve units between the lines, use of a simple throtting valve for valve 49 as well as valve 48 could be satisfactory. To take care of minor and temporary or accidental fluctuations in pressure, as in the time required for the so-called constant pressure pump to adjust its output to variations in demand, it is found by trial that for very precise results a throttling valve of the type usually termed a relief valve is most satisfactory. The valve 48 is set by hand to a position having desirable throttling characteristics in the combination, and remains fixed in this position till further set by hand for a major variation in operating pressure. The valve 49 to be described is a special relief valve not of my invention. In this valve the hydraulic pressure on the intake side ("intermediate" for the system) is opposed to the action of a spring the compression load on which is adjusted by hand to such a value as will result in the desired intake ("intermediate") pressure. The valve then takes up a substantially constant position under this adjustment so as to permit the amount of flow required to maintain the desired adjustment so as to permit the amount of flow required to maintain the desired intermediate pressure. This flow is that appropriate to the orifice dimension in valve 48 and the desired differential between the initial pressure and the intermediate pressure. If the initial pressure were to vary momentarily, the amount of flow would be automatically varied by change of the relief valve plunger position to keep the intermediate pressure constant.

The deflection of the test specimen at each point of loading is indicated by the mechanism shown in Fig. 9. A supporting beam 53 is disposed above and in the plane of the axis of the test specimen 36. A plurality of pulleys 54 are fixed to the underside of the beam 53 and a like number of pulleys are mounted on the upper portion of frame 55. A wire 56 is connected to the test specimen at each point whereof the deflection is to be measured and is passed over one of the pulleys carried by beam 53 and also one of the pulleys on the frame 55. A weight 57 is attached to the end of each wire and lies against a suitable chart 58. A mark is made at the bottom of the weight or weights 57 when the test specimen is unloaded and also at each load at which it is desired to measure the deflection. It is apparent that when the test specimen is moved downwardly under load at any point, the corresponding weight 57 will be raised on the chart and vice versa. The number of wires and indicating weights employed may be made as great as necessary to obtain the desired number of readings of deflection.

It will be readily apparent to those skilled in the art that the apparatus above described may be used in many ways other than to make tests in the particular manner set forth.

For example, if it be desired to test a specimen repeatedly in connection with fatigue or endurance stresses, the necessary force can be applied by using a pump control capable of repeatedly applying and releasing the pressure. If the test requires the application of the load upwardly at some points and downwardly at others, or upward generally, this can be done by suitable staying of the beam against upward travel and using the jacks above the base beam to act upon the lower member of the test specimen through bearing blocks 65, 66 and 67 instead of through tension straps over the upper member, as in Fig. 14.

The invention described herein may be manufactured and used by or for the Government of the United States of America for govermental purposes, without the payment of any royalty thereon.

I claim:

1. In a testing device, a base beam and a back beam substantially continuous therewith, an upright standard connected to both said beams at the junction thereof, a back stay connecting said standard and said back beam, a lift reaction stay extending from said standard in the same direction as the base beam to support at one point an object being tested whereof the other end is supported by said standard, a plurality of stirrups suspended from said object at different points, a jack mounted in each stirrup and fixed reaction means against which each jack may act to apply force to its stirrup.

2. In a testing device, a base beam and a back beam substantially continuous therewith, an upright standard connected to both said beams at the junction thereof, a back stay connecting said standard and said back beam, a lift reaction stay extending from said standard in the same direction as the base beam to support at one point an object being tested whereof the other end is supported by said standard, a stirrup suspended from said object, a jack mounted in said stirrup and fixed reaction means against which said jack may act to apply force to its stirrup.

3. In a testing device, a base beam and a back beam substantially continuous therewith, an upright standard connected to both said beams at the junction thereof, a back stay connecting said standard and said back beam, a lift reaction stay extending from said standard in the same direction as said base beam to support at one point an object being tested whereof the other end is supported by said standard, and means to load said object at different points.

4. In a testing device, a base beam and a back beam substantially continuous therewith, an upright standard connected to both said beams at the junction thereof, a back stay connecting said standard and said back beam, a lift reaction stay extending from said standard in the same direction as said base beam to support at one point an object being tested whereof the other end is supported by said standard, means to load said object at different points, and means to measure the stress applied at each of said points.

5. In a testing device, means to support a test specimen at one end, means to support said specimen at a point spaced therefrom, said last mentioned means being disposed to set up a force component axially of said specimen, means to load said specimen at a plurality of points, means to measure the stress applied at each of said points, and means to measure the strain in said specimen due to each of said stresses.

6. In a testing device, means to support a test specimen, a plurality of straps engaged with said specimen, an indicating dynamometer connected to each of said straps, a stirrup connected to each of said dynamometers, a hydraulic jack carried by each of said stirrups, means to supply fluid under constant pressure, means to divert from said fluid a stream to each of said jacks under controlled pressure which may be different at each jack and reaction means against which said jacks may act whereby the force exerted by said jacks is impressed upon said stirrups.

7. In a testing device, means to apply load to a test specimen comprising a hydraulic jack, a constant pressure pump, a pipe to carry the discharge of said pump, a return pipe connected to said pump, a feed pipe connecting said discharge pipe and said return pipe, a throttling valve and a relief valve connected in said feed pipe at spaced apart points and means connecting the pressure chamber of said jack to said feed pipe between said throttling valve and said relief valve.

8. In a testing device, a plurality of hydraulic jacks, means to supply fluid under constant pressure to said jacks, which may be different at each jack and means including a stress measuring device through which load is transmitted for connecting each of said jacks to a test specimen.

9. In a testing device, a base beam and a back beam substantially continuous therewith, an upright standard connected to both said beams at the junction thereof, a back stay connecting said standard and said back beam, a lift reaction stay extending from said standard in the same direction as the base beam to support at one point an object being tested whereof the other end is supported by said standard and means to apply stresses to said object.

10. In a testing device, a base beam and a back beam substantially continuous therewith, an upright standard connected to both said beams at the junction thereof, a back stay connecting said standard and said back beam, a lift reaction stay extending from said standard in the same direction as the base beam to support at one point an object being tested whereof the other end is supported by said standard, means to apply stresses to said object and means to measure the deformation of said object due to the application of such stresses.

11. In a testing device, means to apply load to a test specimen comprising a plurality of hydraulic jacks, a constant pressure pump, a discharge pipe and a return pipe to carry fluid from and to said pump, a plurality of cross connections between said pipes, means associated with each connection to maintain in such connection a desired pressure, each of which pressures may be different from the others, and means operatively connecting each of said cross connections to a respective jack.

12. In a testing device, means to apply load to a test specimen comprising a plurality of hydraulic jacks, means for maintaining a principal body of fluid at constant pressure, means for maintaining a plurality of subsidiary streams deriving from said principal body continuously circulating from the second mentioned means through said jacks and back to the said second means and at pressures determined individually for each such subsidiary stream, and means operatively connecting each jack to one subsidiary stream.

13. In a testing device a base beam and a back beam substantially continuous therewith, an upright standard fixed to both of said beams at the junction thereof, a back stay connecting said standard and said back beam, a lift reaction stay extending from said standard in the same direction as the base beam to support at one point an object being tested whereof the other end is supported by said standard, and means to apply independently variable and freely spaceable loads to such object, said applied loads being predeterminable regardless of deflection due to the application of loads at other points.

LLOYD HARRISON.